US006767638B2

(12) United States Patent
Samaranayake

(10) Patent No.: US 6,767,638 B2
(45) Date of Patent: Jul. 27, 2004

(54) CORE-SHELL POLYMERIC COMPOSITIONS

(75) Inventor: Gamini S. Samaranayake, Mount Pleasant, SC (US)

(73) Assignee: MeadWestvaco Corporation, Stamford, CT (US)

( * ) Notice: Subject to any disclaimer, the term of this patent is extended or adjusted under 35 U.S.C. 154(b) by 85 days.

(21) Appl. No.: 10/291,141

(22) Filed: Nov. 8, 2002

(65) Prior Publication Data

US 2003/0215604 A1 Nov. 20, 2003

Related U.S. Application Data

(63) Continuation-in-part of application No. 10/147,655, filed on May 16, 2002, now Pat. No. 6,572,969, and a continuation-in-part of application No. 10/194,352, filed on Jul. 12, 2002, now Pat. No. 6,521,343.

(51) Int. Cl.$^7$ .............. B32B 5/16; G03C 1/72
(52) U.S. Cl. ............ 428/407; 430/138; 525/288; 525/902
(58) Field of Search .............. 428/403, 407; 430/138; 528/288, 902

(56) References Cited

U.S. PATENT DOCUMENTS

| | | | |
|---|---|---|---|
| 4,404,310 A | 9/1983 | Maslanka et al. | |
| 4,434,267 A | 2/1984 | Maslanka et al. | |
| 4,460,637 A | 7/1984 | Miyamoto et al. | |
| 4,469,555 A | 9/1984 | Maslanka et al. | |
| 4,483,959 A | 11/1984 | Maslanka et al. | |
| 4,636,805 A | 1/1987 | Toganoh et al. | |
| 4,876,313 A | 10/1989 | Lorah | |
| 4,916,171 A | 4/1990 | Brown et al. | |
| 4,926,190 A | 5/1990 | Laver | |
| 5,096,781 A | 3/1992 | Vieira et al. | |
| 5,100,951 A | 3/1992 | Fillipo et al. | |
| 5,124,723 A | 6/1992 | Laver | |
| 5,132,383 A | 7/1992 | Larson et al. | |
| 5,212,251 A | 5/1993 | Lorah et al. | |
| 5,334,480 A | 8/1994 | Inaba et al. | |
| 5,372,884 A | 12/1994 | Abe et al. | |
| 5,478,631 A | 12/1995 | Kawano et al. | |
| 5,609,980 A | 3/1997 | Matthews et al. | |
| 5,708,093 A | 1/1998 | Bastelberger et al. | |
| 5,891,229 A | 4/1999 | Nohr et al. | |
| 5,928,830 A | 7/1999 | Cheng et al. | |
| 6,010,790 A | 1/2000 | Chen et al. | |
| 6,057,384 A | 5/2000 | Nguyen | |
| 6,248,805 B1 | 6/2001 | Nguyen et al. | |
| 6,312,807 B1 | 11/2001 | Ludwig et al. | |
| 6,348,541 B1 | 2/2002 | Kanda et al. | |
| 6,417,249 B1 | 7/2002 | Nguyen et al. | |
| 6,521,342 B1 * | 2/2003 | Hutter et al. | 428/407 |
| 6,521,343 B1 * | 2/2003 | Samaranayake et al. | 428/407 |
| 6,572,969 B1 * | 6/2003 | Samaranayake | 428/407 |

FOREIGN PATENT DOCUMENTS

| | | |
|---|---|---|
| EP | 0478193 | 4/1992 |
| EP | 0796901 | 9/1997 |
| EP | 0875544 | 4/1998 |
| EP | 1006161 | 6/1999 |
| WO | WO9104990 | 4/1991 |

OTHER PUBLICATIONS

U.S. patent application Ser. No. 10/194352, Samaranayake et al., filed Jul. 2002.
U.S. patent application Ser. No. 10/171329, Hutter et al., filed Jun. 2002.
U.S. patent application Ser. No. 10/147655, Samaranayake, filed May 2002.

* cited by examiner

*Primary Examiner*—H. Thi Le
(74) *Attorney, Agent, or Firm*—Daniel B. Reece, IV; Terry B. McDaniel

(57) ABSTRACT

This invention concerns cationic core-shell particles having a polymeric core component and a polymeric shell component disposed generally about said core, wherein said shell contains a stabilizer that is covalently bonded to the polymeric shell component. More particularly, the invention concerns the use of these core-shell particles in formulating ink jet receptive coatings.

24 Claims, No Drawings

CORE-SHELL POLYMERIC COMPOSITIONS

This application is a continuation-in-part of our commonly assigned, U.S. patent application Ser. No. 10/147,655 filed May 16, 2002, now U.S. Pat. No. 6,572,969, entitled "Core Shell Polymeric Compositions" and Ser. No. 10/194,352 filed Jul. 12, 2002, now U.S. Pat. No. 6,521,343, entitled "Cationic Core-Shell Particles With Stabilizer-Containing Acid-Swellable Shells."

FIELD OF INVENTION

This invention concerns cationic core-shell particles having a polymeric core component and a polymeric shell component disposed generally about said core, wherein said shell contains a stabilizer that is covalently bonded to the polymeric shell component. More particularly, the invention concerns the use of these core-shell particles in formulating ink jet receptive coatings.

BACKGROUND OF THE INVENTION

Ink jet printing is widely used to print on a variety of substrates (including paper, textiles, and plastic films). These substrates are often coated with a material that enhances their receptivity for the ink jet ink. Ink jet images are formed by spraying ink formulations, the majority of which are aqueous dye-based ink solutions, onto the ink jet receptive coating. The dyes are molecularly adsorbed on the surface of the coating, where they are subsequently exposed to ambient atmospheric pollutants and light. Over time, photochemical reactions and chemical reactions with oxygen, ozone, nitrogen oxides, and/or sulfur oxides commonly cause the dyes to fade.

A traditional method of attempting to improve the fade resistance of ink jet prints has been to add stabilizers to ink jet ink formulations. For example, U.S. Pat. No. 5,124,723 describes ink formulations, which contain hydroxyphenyl-benzotriazole light absorbers produced as water-soluble sulfonate salts. The use of ink formulations containing water-soluble porphines as light absorbers is described in U.S. Pat. No. 5,891,229.

Another approach in the attempt to improve ink jet fade resistance has been to add stabilizers to ink jet coating formulations. U.S. Pat. No. 4,926,190 describes the addition of substituted hydroxyphenylbenzotriazole derivatives to a coating mixture. The use of water-soluble ultraviolet absorbers in a coating formulation is described in U.S. Pat. No. 5,096,781.

The use of water-soluble light stabilizers in ink jet receptive coatings has proven to be somewhat inefficient in that the stabilizers tend to migrate into the fibers of coated fiber-containing substrates. This same migration problem is faced by ink formulations that contain stabilizers as formulation additives; and once the ink is separated from its aqueous polymeric vehicle, the dye is open to interaction with ambient conditions. However, if the stabilizers were not water-soluble, their oleophilic nature would not allow appreciable concentrations of the stabilizers in aqueous based coating systems when employed as formulation additives.

Another problem often experienced with the use of light stabilizers as formulation additives is the tendency of the stabilizers to be extruded out of the substrate (a condition known as "blooming"). Such blooming can cause a lost in effectiveness as well as dust formation problems.

Therefore, an object of this invention is to solve these major problems by disclosing cationic core-shell particles which exhibit properties that make them suitable for formulating ink jet receptive coatings.

Another object of this invention is to disclose cationic core-shell particles.

A further object of this invention is to disclose core-shell particle latexes.

Another object of this invention is to disclose efficient, economical ink jet receptive coatings that are resistant to blooming.

SUMMARY OF THE INVENTION

The present invention achieves these objects and others via the production of cationic core-shell particles having a polymeric core component and a polymeric shell component disposed generally about said core, wherein said shell contains a stabilizer that is covalently bonded to the shell. As used herein the term "stabilizer" means a compound which contains in its molecular chain sites possessing ultraviolet absorbing activity, free radical scavenging activity, antioxidant activity, and/or peroxide decomposing activity.

Due to the core-shell morphology of the particle, only the shell component contains stabilizer (which is covalently bound to the shell polymer). This is an improvement over prior technologies in that the present invention permits placement of the stabilizer where the dye is actually adsorbed into the ink jet receptive coating. Moreover, the core-shell morphology allows one to use smaller quantities of the stabilizer while effecting a greater surface concentration.

The covalent bonding of the stabilizer to the shell component avoids the migration problems often associated with the use of water-soluble light stabilizers as formulation additives to inks or ink jet receptive coatings. Additionally, the binding of the stabilizer into the polymer backbone of the shell component prevents blooming.

However, the presence of both a stabilizer and an amine-containing ethylenically unsaturated monomer in the shell component of the particle may cause a hydrolysis reaction (which can reduce the light stabilized characteristics of the particle). This potential problem is avoided by incorporating the amine-containing ethylenically unsaturated monomer into the core component of the particle instead of the shell component.

Also, the incorporation of at least one amine-containing ethylenically unsaturated monomer into the core component of the cationic core-shell particles of the present invention improves the film-forming characteristics (e.g., gloss, distinctness of image of ink jet printed materials, etc.) of these particles when compared to analogous core-shell particles that do not contain such monomers.

DESCRIPTION OF THE PREFERRED EMBODIMENT

The cationic core-shell particles suitable for use in formulating ink jet receptive coatings comprise:

(A) a polymeric core component, said core component comprising the free radical polymerization reaction product of a mixture comprising:
  (1) about 45.0% to about 95.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) about 0.5% to about 30.0% by total weight of the mixture of a member selected from the group consisting of ethylenically unsaturated monomers containing at least one quaternary ammonium group and combinations thereof;

(3) about 4.5% to about 35.0% by total weight of the mixture of a member selected from the group consisting of amine-containing ethylenically unsaturated monomers and combinations thereof; and (4) a catalytic amount of polymerization initiator; and (B) a polymeric shell component disposed generally about said core component, said shell component comprising the free radical polymerization reaction product of a mixture comprising:

(1) about 70.0% to about 99.5.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) up to about 30.0% by total weight of the mixture of a member selected from the group consisting of ethylenically unsaturated monomers containing at least one quaternary ammonium group and combinations thereof;

(3) about 0.5% to about 30.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof; and (4) a catalytic amount of polymerization initiator; and wherein said stabilizer is covalently bound to said shell component.

Preferred cationic core-shell particles comprise:

(A) a polymeric core component, said core component comprising the free radical polymerization reaction product of a mixture comprising:

(1) about 60.0% to about 70.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) about 10.0% to about 15.0% by total weight of the mixture of a member selected from the group consisting of ethylenically unsaturated monomers containing at least one quaternary ammonium group and combinations thereof;

(3) about 20.0% to about 30.0% by total weight of the mixture of a member selected from the group consisting of amine-containing ethylenically unsaturated monomers and combinations thereof; and (4) a catalytic amount of polymerization initiator; and (B) a polymeric shell component disposed generally about said core component, said shell component comprising the free radical polymerization reaction product of a mixture comprising:

(1) about 80.0% to about 95.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) up to about 15.0% by total weight of the mixture of a member selected from the group consisting of ethylenically unsaturated monomers containing at least one quaternary ammonium group and combinations thereof;

(3) about 5.0% to about 20.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof; and (4) a catalytic amount of polymerization initiator; and wherein said stabilizer is covalently bound to said shell component.

The polymeric core component comprises from about 60% to about 90% of the total weight of the core-shell particle. It is preferred that the core component constitute from about 70% to about 88% of the total weight of the particle.

The polymeric core component comprises the free radical polymerization reaction product of a mixture comprising:

(1) about 45.0% to about 95.0% (preferably from about 60.0% to about 70.0%) by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) about 0.5% to about 30.0% (preferably from about 10.0% to about 15.0%) by total weight of the mixture of a member selected from the group consisting of ethylenically unsaturated monomers containing at least one quaternary ammonium group and combinations thereof;

(3) about 4.5% to about 35.0% (preferably from about 20.0% to about 30.0%) by total weight of the mixture of a member selected from the group consisting of amine-containing ethylenically unsaturated monomers and combinations thereof; and (4) a catalytic amount of polymerization initiator.

It is preferred that the ethylenically unsaturated monomer containing at least one quaternary ammonium group employed in the production of the polymeric core component be a salt selected from the group consisting of vinylbenzyltrimethylammonium salts, acryloyloxyethyltrimethylammonium salts, acryloyloxyethyldiethylmethylammonium salts, methacryloyloxyethyltrimethylammonium salts, methacryloyloxyethylbenzyldimethylammonium salts, acryloyloxyethylbenzyldimethylammonium salts, 2-Hydroxy-3-methacryloyloxypropyltrimethylammonium salts, 2-Hydroxy-3-acryloyloxypropyltrimethylammonium salts, methacrylamidopropyltrimethylammonium salts, and combinations thereof; wherein said salt contains at least one counter anion selected from the group consisting of halides, sulfates, alkylsulfates, arylsulfates, and combinations thereof. It is further preferred that the counter anion be a member selected from the group consisting of chloride, bromide, methosulfate, sulfate, and combinations thereof.

It is preferred that the amine-containing ethylenically unsaturated monomer be a member selected from the group consisting of acrylates of alcohols that contain at least one tertiary amino group, acrylamides of amines that contain at least one tertiary amine group, the condensation reaction product of maleic anhydride and aminoethylpiperidine, 2-vinylpyridine, 4-vinylpyridine, maleic anhydride aminoethylpiperidine, and combinations thereof.

Acrylates of alcohols containing at least one tertiary amino group which are suitable for use in the present invention include, but are not limited to, those compounds having the chemical structure shown in Structure A below:

STRUCTURE A

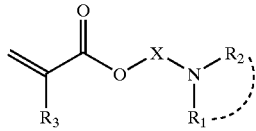

Where,

X=alkyl groups of from 2 to 4 carbon atoms, aryl groups, and polyoxyethylenyl groups of the type —$CH_2$—$CH_2$ $(OCH_2CH_2)_n$ where n=from 1 to about 40, $R_1$=alkyl groups containing from 1 to about 24 carbon atoms, aryl groups containing from 1 to about 24 carbon atoms, and polyoxyethylenyl groups of the type —$CH_2$—$CH_2(OCH_2CH_2)_n$ where n=from 1 to about 40, $R_2$=alkyl groups containing from 1 to about 24 carbon atoms, aryl groups containing from 1 to about 24 carbon atoms, and polyoxyethylenyl groups of the type —$CH_2$—$CH_2(OCH_2CH_2)_n$ where n=from 1 to about 40, and $R_3$=H or $CH_3$.

Where desired, the —$NR_1 R_2$ moiety in Structure A may be replaced by a nitrogen-containing heterocyclic ring such as morpholines, pyrrolidines, piperadines, piperazines, pyridines, and the like where the attachment to X can be through the N atom or at other locations on the heterocyclic ring.

Preferred acrylates of alcohols containing at least one tertiary amino group which are suitable for use in the present invention include dimethylaminoethyl acrylate, diethylaminoethyl acrylate, pyrrolidinoethyl acrylate, t-butylaminoethyl acrylate, morpholinoethyl acrylate, (N-methylpiperazinyl)ethyl acrylate, polyoxyethylene(15) cocoamine acrylate, dimethylaminophenethylacrylate, 2-pyridinethylacrylate, dimethylaminoethyl methacrylate, diethylaminoethyl methacrylate, pyrrolidinoethyl methacrylate, t-butylaminoethyl methacrylate, morpholinoethyl methacrylate, (N-methylpiperazinyl)ethyl methacrylate, polyoxyethylene(15) cocoamine methacrylate, dimethylaminophenethylmethacrylate, 2-pyridinethylmethacrylate, and combinations thereof.

Acrylamides of amines containing at least one tertiary amine group which are suitable for use in the present invention include, but are not limited to, those compounds having the chemical structure shown in Structure B below:

STRUCTURE B

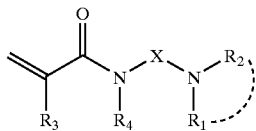

Where,

X=alkyl groups of from 2 to 4 carbon atoms, aryl groups, and polyoxyethylenyl groups of the type —$CH_2$—$CH_2$ $(OCH_2CH_2)_n$ where n=from 1 to about 40, $R_1$=alkyl groups containing from 1 to about 24 carbon atoms, aryl groups containing from 1 to about 24 carbon atoms, and polyoxyethylenyl groups of the type —$CH_2$—$CH_2(OCH_2CH_2)_n$ where n=from 1 to about 40, $R_2$=alkyl groups containing from 1 to about 24 carbon atoms, aryl groups containing from 1 to about 24 carbon atoms, and polyoxyethylenyl groups of the type —$CH_2$—$CH_2(OCH_2CH_2)_n$ where n=from 1 to about 40, $R_3$=H or $CH_3$, and $R_4$=H, alkyl groups containing from 1 to about 24 carbon atoms, aryl groups containing from 1 to about 24 carbon atoms, and polyoxyethylenyl groups of the type —$CH_2$—$CH_2(OCH_2CH_2)_n$ where n=from 1 to about 40.

Where desired, the —$NR_1R_2$ moiety in Structure B may be replaced by a nitrogen-containing heterocyclic ring such as morpholines, pyrrolidines, piperadines piperazines, pyridines, and the like where the attachment to X can be through the N atom or at other locations on the heterocyclic ring.

Preferred acrylamides of amines containing at least one tertiary amine group which are suitable for use in the present invention include dimethylaminoethylacrylamide, dimethylaminopropylacrylamide, pyrrolidinoethylacrylamide, morpholinoethylacrylamide, morpholinemethylacrylamide, (N-methylpiperazinyl)ethyl acrylamide, dimethylaminophenethylacrylamide, dimethylaminoethylmethacrylamide, dimethylaminopropylmethacrylamide, pyrrolidinoethylmethacrylamide, morpholinoethylmethacrylamide, morpholinemethylmethacrylamide, (N-methylpiperazinyl)ethyl methacrylamide, dimethylaminophenethylmethacrylamide, 1-methyl-4-acryloylpiperazines, and combinations thereof.

The polymeric shell component comprises from about 10% to about 40% of the total weight of the core-shell particle. It is preferred that the shell component constitute from about 12% to about 30% of the total weight of the particle.

The polymeric shell component comprises the free radical polymerization reaction product of a mixture comprising:

(1) about 70.0% to about 99.5% (preferably from about 80.0% to about 95.0%) by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) up about 30.0% (preferably up to about 15.0%) by total weight of the mixture of a member selected from the group consisting of ethylenically unsaturated monomers containing at least one quaternary ammonium group and combinations thereof;

(3) about 0.5% to about 30.0% (preferably from about 5.0% to about 15.0%, and more preferably from about 5.0% to about 12.0%) by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof; and (4) a catalytic amount of polymerization initiator.

The dyes that are commonly employed in aqueous ink jet inks are anionic, containing sulfonic acid groups. The cationic nature of the core-shell particle serves to fix such anionic dyes. Where desired, the core-shell particle's cationic nature may be increased by incorporating ethylenically unsaturated monomer containing at least one quaternary ammonium group in the production of the polymeric shell component. Where employed, it is preferred that said ethylenically unsaturated monomer be a salt selected from the group consisting of vinylbenzyltrimethylammonium salts, acryloyloxyethyltrimethylammonium salts, acryloyloxyethyldiethylmethylammonium salts, methacryloyloxyethyltrimethylammonium salts, methacryloyloxyethylbenzyldimethylammonium salts, acryloyloxyethylbenzyldimethylammonium salts, 2-Hydroxy-3-methacryloyloxypropyltrimethylammonium salts, 2-Hydroxy-3-acryloyloxypropyltrimethylammonium salts, methacrylamidopropyltrimethylammonium salts, and combinations thereof; wherein said salt contains at least one counter anion selected from the group consisting of halides, sulfates, alkylsulfates, arylsulfates, and combinations thereof. It is further preferred that the counter anion be a member selected from the group consisting of chloride, bromide, methosulfate, sulfate, and combinations thereof.

The incorporation of a stabilizer in the free radical polymerization reaction results in the stabilizer being covalently bonded to the polymeric shell component. Any ultraviolet absorber, radical scavenger, antioxidant, or peroxide decomposer which contains at least one ethylenically unsaturated group (thereby being capable of covalent bonding to the polymeric shell component via free radical polymerization reaction) is suitable for use in the present invention. Commonly known methods of producing such compounds containing at least one ethylenically unsaturated group include acryloyation and reacting the compound to be modified with a reactant that contains at least one acryloyl group (e.g., glycidyl (meth)acrylate or isocyanatoethyl (meth)acrylate). Where an ultraviolet absorber is employed as a stabilizer it is preferred that the absorber be a member selected from the group consisting of hydroxyphenylbenzotrazoles containing at least one ethylenically unsaturated group, hydroxybenzophenones containing at least one ethylenically unsaturated group, porphines which have been modified to contain at least one ethylenically unsaturated group, and combinations thereof. Where a radical scavenger is employed as a stabilizer it is preferred that the scavenger be a member selected from the group consisting of tetramethylpiperadine derivatives containing at least one ethylenically unsaturated group and combinations thereof. Where an antioxidant is employed as a stabilizer it is preferred that the antioxidant be a member selected from the group consisting of sterically-hindered phenols containing at least one ethylenically unsaturated group, diarylamines containing at least one ethylenically unsaturated group, and combinations thereof. Where a peroxide decomposer is employed as a stabilizer it is preferred that the decomposer be a member selected from the group consisting of triphenyl phosphites which have been modified to contain at least one ethylenically unsaturated group, mercaptans which have been modified to contain at least one ethylenically unsaturated group, and combinations thereof. Suitable modified triphenyl phosphites and modified mecaptans (such as modified thiodipropionic acids, thiobenzimidazoles, bisaryldisuophides, and the like) may be produced by any method which results in the modified compound containing at least one ethylenically unsaturated group. For example, triphenyl phosphite can be prepared with a combination of styryl phenol and 2,4-di-tertiary butyl phenol. Likewise, thiodipropionic acid can be reacted with glycidyl methacrylate to produce the modified compound. The polymeric shell component does not swell upon pH adjustment.

Where desired, the core-shell particle may comprise a plurality of shell components, each disposed about the core component.

A catalytic amount of polymerization initiator is used in the free radical polymerization reactions. The amount of initiator employed commonly comprises from about 0.1% to about 3.0% (preferably from about 0.2% to about 2.0%) by weight of the total mixture used to produce the respective polymeric component. Traditional polymerization initiators (such as thermal initiators, redox initiators, and the like) are suitable for use in the free radical polymerization reaction. Examples of suitable thermal initiators include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, and combinations thereof. Examples of suitable redox initiators include, but are not limited to, the following: cumene hydroperoxide-sodium metabisulfite, cumene hydroperoxide-iron (II) sulfate, and combinations thereof. Preferred initiators include water-soluble azo compounds (such as V-50 or VA-086 manufactured by Wako Chemicals).

While any free radical polymerization reaction is suitable for use in the present invention, it is preferred to employ either an emulsion polymerization reaction or a suspension polymerization reaction. The use of an emulsion polymerization reaction is more preferred.

Latexes suitable for use as ink jet receptive coatings in the present invention include aqueous suspensions of cationic core-shell particles. It is preferred that such latexes have a solids content in the range of about 20.0% to about 60.0%, with the more preferred range being about 30.0% to about 45.0%.

The latexes of the present invention are excellent ink jet receptive coatings which impart superior fade resistances. Such ink jet receptive coatings can be employed to produce ink jet printable products via the process of coating a chosen substrate on at least one side with the ink jet receptive coating. Substrates which are suitable for use in producing such ink jet printable products include paper, paperboard, wood, plastic film, metal foil, textiles, and the like. Where desired, any of the pigments traditionally used in ink jet receptive coatings can be employed in the coating provided that the pigments are compatible with a cationic coating. Such pigments include, but are not limited to, the following:

silica, alumina, plastic pigments, calcium carbonate, kaolin clay, and combinations thereof.

The following examples are provided to further illustrate the present invention and are not to be construed as limiting the invention in any manner.

EXAMPLE 1

A core-shell particle was prepared via the following method. A round-bottom flask equipped with a thermometer, stirrer, and heating mantle was charged with 413.0 g of deionized water, 30.0 g of ARQUAD® C-50 surfactant (a 50% solution of dodecyltrimethylammonium chloride in isopropyl alcohol available from Akzo Nobel), 14.0 g of styrene, 7.0 g of dimethylaminoethylmethacrylate (DMAEMA) 6.0 g of butylacrylate, 5.0 g of methacryloyloxyethyltrimethylammonium chloride (METAC), and a solution of 6.0 g of V-50 (an azo free radical initiator available from Wako Chemicals) in 15.0 g of deionized water. The mixture was heated to 60° C., then 26.0 g of METAC and a solution of 79.0 g of styrene, 39.0 g DMAEMA, and 34.0 g of butylacrylate were added concurrently over a three-hour period.

When the monomer feed was completed, the temperature of the reaction was increased to 70° C. and stirring was continued for one hour. The polymer core component was cooled to 60° C., and a solution of 1.8 g of V-50 (an azo free radical initiator available from Wako Chemicals) in 32.0 g of deionized water, 10.0 g of ARQUAD® C-50 surfactant (a 50% solution of dodecyltrimethylammonium chloride in isopropyl alcohol available from Akzo Nobel), and 70.0 g of deionized water was added. Subsequently, 27.0 g of butylacrylate and a solution of 11.0 g of TINUVIN® 796 (an ethylenically unsaturated hydroxyphenylbenzoltriazole ultraviolet absorber available from Ciba Specialty Chemicals) dissolved in a mixture of 52.0 g styrene were added over a one-hour period. When the feed was completed, the temperature of the reaction was increased to 70° C. and stirring was continued for one hour. After this period the temperature was raised to 85° C., 0.45 g of t-butyl hydroperoxide and a solution of 0.88 g of isoascorbic acid in 10.0 g of deionized water was added, and stirring was continued for a two-hour period to scavenge any residual monomer. The resulting latex comprising the aqueous suspension of core-shell particles had a solids content of around 40%, a viscosity of 140 cP, and a pH of 8 and an average particle size of 66 nm.

An ink jet receptive coating ("Coating No. 1") was produced via the following method. On a dry basis 60 parts of the latex of Example 1 was blended with 20 parts of SYLOJET® 703 (a silica pigment available from W. R. Grace & Co.) and 10 parts of AIRVOL® 205 (a polyvinyl alcohol binder available from Air Products and Chemicals, Inc.).

EXAMPLE 2

For comparison purposes, a core-shell particle having an amine-containing ethylenically unsaturated monomer in both the core and the shell of the particle was prepared via the following method. A round-bottom flask equipped with a thermometer, stirrer, and heating mantle was charged with 413.0 g of deionized water, 30.0 g of ARQUAD® C-50 surfactant (a 50% solution of dodecyltrimethylammonium chloride in isopropyl alcohol available from Akzo Nobel), 19.0 g of styrene, 8.0 g of dimethylaminoethylmethacrylate (DMAEMA) 1.6 g of butylacrylate, 5.0 g of methacryloyloxyethyltrimethylammonium chloride (METAC), and a solution of 6.0 g of V-50 (an azo free radical initiator available from Wako Chemicals) in 15.0 g of deionized water. The mixture was heated to 60° C., then 21.0 g of METAC and a solution of 107.0 g of styrene, 45.0 g DMAEMA, and 5.5 g of butylacrylate were added concurrently over a three-hour period.

When the monomer feed was completed, the temperature of the reaction was increased to 70° C. and stirring was continued for one hour. The polymer core component was cooled to 60° C., and a solution of 1.8 g of V-50 (an azo free radical initiator available from Wako Chemicals) in 32.0 g of deionized water, 10.0 g of ARQUAD® C-50 surfactant (a 50% solution of dodecyltrimethylammonium chloride in isopropyl alcohol available from Akzo Nobel), 70.0 g of deionized water was added. Subsequently, 13.0 g of METAC, 21.0 g DMAEMA, and a solution of 6.3 g of TINUVIN® 796 (an ethylenically unsaturated hydroxyphenylbenzoltriazole ultraviolet absorber available from Ciba Specialty Chemicals) dissolved in a mixture of 54.0 g styrene were added over a one-hour period. When the feed was completed, the temperature of the reaction was increased to 70° C. and stirring was continued for one hour. After this period the temperature was raised to 85° C., 0.45 g of t-butyl hydroperoxide and a solution of 0.88 g of isoascorbic acid in 10.0 g of deionized water was added, and stirring was continued for a two-hour period to scavenge any residual monomer. The resulting latex ("Latex No. 2") comprising the aqueous suspension of core-shell particles had a solids content of around 40%, a viscosity of 140 cP, a pH of 8.1, and an average particle size of 52 nm.

An ink jet receptive coating ("Control Coating No. 2") was produced via the following method. On a dry basis 60 parts of the latex of Example 1 was blended with 20 parts of SYLOJET® 703 (a silica pigment available from W. R. Grace & Co.) and 10 parts of AIRVOL® 205 (a polyvinyl alcohol binder available from Air Products and Chemicals, Inc.).

Coating No. 1 (Example 1) and Control Coating No. 2 were each applied to sheets of silca-coated base paper using a No. 12 wire-wound rod. The coated sheets were air dried for 15 minutes, and test prints were made on the dried sheets using solid RGBCMYK color patches via a Hewlett Packard 952 ink jet printer. Printed samples were passed 12, 24, and 36 times at 18 feet per minute through a Fusion Systems UV curing machine with a medium pressure mercury lamp, and color densities were measured after each interval. Coating No. 1 exhibited superior fade resistances when compared to Control Coating No. 2.

EXAMPLE 3

For comparison purposes, a core-shell particle that did not contain an amine-containing ethylenically unsaturated monomer in either the core or the shell of the particle was prepared via the following method. A round-bottom flask equipped with a thermometer, stirrer, and heating mantle was charged with 413.0 g of deionized water, 30.0 g of ARQUAD® C-50 surfactant (a 50% solution of dodecyltrimethylammonium chloride in isopropyl alcohol available from Akzo Nobel), 19.0 g of styrene, 9.5 g of butylacrylate, 3.0 g of methacryloyloxyethyltrimethylammonium chloride (METAC), and a solution of 6.0 g of V-50 (an azo free radical initiator available from Wako Chemicals) in 15.0 g of deionized water. The mixture was heated to 60° C., then 18.0 g of METAC and a solution of 107.0 g of styrene and 53.5 g of butylacrylate were added concurrently over a three-hour period. When the monomer feed was completed, the temperature of the reaction was increased to 70° C. and stirring was continued for one hour. The polymer core component was cooled to 60° C., and a solution of 1.8 g of V-50 (an azo free radical initiator available from Wako Chemicals) in 32.0 g of deionized water, 10.0 g of ARQUAD® C-50 surfactant (a 50% solution of dodecyltrimethylammonium chloride in isopropyl alcohol available from Akzo Nobel), and 70.0 g of deionized water were added. Subsequently, 13.0 g of METAC, 27.0 g butylacrylate, and a solution of 6.3 g of TNUVIN® 796 (an ethylenically unsaturated hydroxyphenylbenzoltriazole ultraviolet absorber available from Ciba Specialty Chemicals) dissolved in a mixture of 57.0 g styrene were added over a one-hour period. When the feed was completed, the temperature of the reaction was increased to 70° C. and stirring was continued for one hour. After this period the temperature was raised to 85° C., 0.45 g of t-butyl hydroperoxide and a solution of 0.88 g of isoascorbic acid in 10.0 g of deionized water was added, and stirring was continued for a two-hour period to scavenge any residual monomer. The resulting latex comprising the aqueous suspension of core-shell particles had a solids content of around 40%, a viscosity of 140 cP, and a pH of 8. And an average particle size of 60 nm.

An ink jet receptive coating ("Control Coating No. 3") was produced via the following method. On a dry basis 60 parts of the latex of Example 1 was blended with 20 parts of SYLOJET® 703 (a silica pigment available from W. R. Grace & Co.) and 10 parts of AIRVOL® 205 (a polyvinyl alcohol binder available from Air Products and Chemicals, Inc.).

Coating No. 1 (Example 1) and Control Coating No. 3 were each applied to sheets of silca-coated base paper using a No. 12 wire-wound rod. The coated sheets were air dried for 15 minutes, and test prints were made on the dried sheets using solid RGBCMYK color patches via a Hewlett Packard 952 ink jet printer. Printed samples were passed 12, 24, and 36 times at 18 feet per minute through a Fusion Systems UV curing machine with a medium pressure mercury lamp, and color densities were measured after each interval. Coating No. 1 exhibited superior film-forming characteristics and fade resistances when compared to Control Coating No. 3.

EXAMPLE 4

A core-shell particle can be prepared via the following method. A round-bottom flask equipped with a thermometer, stirrer, and heating mantle is charged with 413.0 g of deionized water, 30.0 g of ARQUAD® C-50 surfactant (a 50% solution of dodecyltrimethylammonium chloride in isopropyl alcohol available from Akzo Nobel), 14.0 g of styrene, 7.0 g of morpholinoethylmethacrylate, 6.0 g of butylacrylate, 5.0 g of methacryloyloxyethyltrimethylammonium chloride (METAC), and a solution of 6.0 g of V-50 (an azo free radical initiator available from Wako Chemicals) in 15.0 g of deionized water. The mixture is heated to 60° C., then 26.0 g of METAC and a solution of 79.0 g of styrene, 39.0 g morpholinoethylmethacrylate, and 34.0 g of butylacrylate are added concurrently over a three-hour period.

When the monomer feed is completed, the temperature of the reaction is increased to 70° C. and stirring is continued for one hour. The polymer core component is cooled to 60° C., and a solution of 1.8 g of V-50 (an azo free radical initiator available from Wako Chemicals) in 32.0 g of deionized water is added, 10.0 g of ARQUAD® C-50 surfactant (a 50% solution of dodecyltrimethylammonium chloride in isopropyl alcohol available from Akzo Nobel), and 70.0 g of deionized water is added. Subsequently, 27 g of butylacrylate and a solution of 11.0 g of TINUVIN® 796 (an ethylenically unsaturated hydroxyphenylbenzoltriazole ultraviolet absorber available from Ciba Specialty Chemicals) dissolved in a mixture of 52.0 g styrene is added over a one-hour period. When the feed is completed, the temperature of the reaction is increased to 70° C. and stirring is continued for one hour. After this period the temperature is raised to 85° C., 0.45 g of t-butyl hydroperoxide and a solution of 0.88 g of isoascorbic acid in 10.0 g of deionized water is added, and stirring is continued for a two-hour period to produce a latex comprising an aqueous suspension of core-shell particles.

EXAMPLE 5

A core-shell particle can be prepared via the following method. A round-bottom flask equipped with a thermometer, stirrer, and heating mantle is charged with 413.0 g of deionized water, 30.0 g of ARQUAD® C-50 surfactant (a 50% solution of dodecyltrimethylammonium chloride in isopropyl alcohol available from Akzo Nobel), 14.0 g of styrene, 7.0 g of 2-pyridinethylmethacrylate, 6.0 g of butylacrylate, 5.0 g of methacryloyloxyethyltrimethylammonium chloride (METAC), and a solution of 6.0 g of V-50 (an azo free radical initiator available from Wako Chemicals) in 15.0 g of deionized water. The mixture is heated to 60° C., then 26.0 g of METAC and a solution of 79.0 g of styrene, 39.0 g of 2-pyridinethylmethacrylate and 34.0 g of butylacrylate are added concurrently over a three-hour period.

When the monomer feed is completed, the temperature of the reaction is increased to 70° C. and stirring is continued for one hour. The polymer core component is cooled to 60° C., and a solution of 1.8 g of V-50 (an azo free radical initiator available from Wako Chemicals) in 32.0 g of deionized water, 10.0 g of ARQUAD® C-50 surfactant (a 50% solution of dodecyltrimethylammonium chloride in isopropyl alcohol available from Akzo Nobel), and 70.0 g of deionized water is added. Subsequently, 27.0 g of butylacrylate and a solution of 11.0 g of TINUVIN® 796 (an ethylenically unsaturated hydroxyphenylbenzoltriazole ultraviolet absorber available from Ciba Specialty Chemicals) dissolved in a mixture of 52.0 g styrene are added over a one-hour period. When the feed is completed, the temperature of the reaction is increased to 70° C. and stirring is continued for one hour. After this period the temperature is raised to 85° C., 0.45 g of t-butyl hydroperoxide and a solution of 0.88 g of isoascorbic acid in 10.0 g of deionized water is added, and stirring is continued for a two-hour period to produce a latex comprising an aqueous suspension of core-shell particles.

EXAMPLE 6

A core-shell particle can be prepared via the following method. A round-bottom flask equipped with a thermometer, stirrer, and heating mantle is charged with 413.0 g of deionized water, 30.0 g of ARQUAD® C-50 surfactant (a 50% solution of dodecyltrimethylammonium chloride in isopropyl alcohol available from Akzo Nobel), 14.0 g of styrene, 7.0 g of pyrrolidinoethyl acrylamide, 6.0 g of butylacrylate, 5.0 g of methacryloyloxyethyltrimethylammonium chloride (METAC), and a solution of 6.0 g of V-50 (an azo free radical initiator available from Wako Chemicals) in 15.0 g of deionized water. The mixture is heated to 60° C., and 34.0 g of butylacrylate, 26.0 g of METAC, and a solution of 79.0 g of styrene, 39.0 g of pyrrolidinoethyl acrylamide are added concurrently over a three-hour period.

When the monomer feed is completed, the temperature of the reaction is increased to 70° C. and stirring is continued for one hour. The polymer core component is cooled to 60° C., and a solution of 1.8 g of V-50 (an azo free radical initiator available from Wako Chemicals) in 32.0 g of deionized water, 10.0 g of ARQUAD® C-50 surfactant (a 50% solution of dodecyltrimethylammonium chloride in isopropyl alcohol available from Akzo Nobel), and 70.0 g of deionized water is added. Subsequently, 27.0 g of butylacrylate and a solution of 11.0 g of TINUVIN® 796 (an ethylenically unsaturated hydroxyphenylbenzoltriazole ultraviolet absorber available from Ciba Specialty Chemicals) dissolved in a mixture of 52.0 g styrene are added over a one-hour period. When the feed is completed, the temperature of the reaction is increased to 70° C. and stirring is continued for one hour. After this period the temperature is raised to 85° C., 0.45 g of t-butyl hydroperoxide and a solution of 0.88 g of isoascorbic acid in 10.0 g of deionized water is added, and stirring is continued for a two-hour period to produce a latex comprising an aqueous suspension of core-shell particles.

EXAMPLE 7

A core-shell particle can be prepared via the following method. A round-bottom flask equipped with a thermometer, stirrer, and heating mantle is charged with 413.0 g of deionized water, 30.0 g of ARQUAD® C-50 surfactant (a 50% solution of dodecyltrimethylammonium chloride in isopropyl alcohol available from Akzo Nobel), 14.0 g of styrene, 7.0 g of polyoxyethylene(15) cocoamine acrylate, 6.0 g of butylacrylate, 5.0 g of methacryloyloxyethyltrimethylammonium chloride (METAC), and a solution of 6.0 g of V-50 (an azo free radical initiator available from Wako Chemicals) in 15.0 g of deionized water. The mixture is heated to 60° C., then 26.0 g of METAC and a solution of 79.0 g of styrene, 39.0 g of polyoxyethylene(15) cocoamine acrylate and 34.0 g of butylacrylate are added concurrently over a three-hour period.

When the monomer feed is completed, the temperature of the reaction is increased to 70° C. and stirring is continued for one hour. The polymer core component is cooled to 60° C., and a solution of 1.8 g of V-50 (an azo free radical initiator available from Wako Chemicals) in 32.0 g of deionized water, 10.0 g of ARQUAD® C-50 surfactant (a 50% solution of dodecyltrimethylammonium chloride in isopropyl alcohol available from Akzo Nobel), and 70.0 g of deionized water are added. Subsequently, 27.0 g of butylacrylate and a solution of 11.0 g of TINUVIN® 796 (an ethylenically unsaturated hydroxyphenylbenzoltriazole ultraviolet absorber available from Ciba Specialty Chemicals) dissolved in a mixture of 52.0 g styrene are added over a one-hour period. When the feed is completed, the temperature of the reaction is increased to 70° C. and stirring is continued for one hour. After this period the temperature is raised to 85° C., 0.45 g of t-butyl hydroperoxide and a solution of 0.88 g of isoascorbic acid in 10.0 g of deionized water is added, and stirring is continued for a two-hour period to produce a latex comprising an aqueous suspension of core-shell particles.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:
1. A cationic core-shell particle suitable for use in formulating ink jet receptive coatings comprising:
(A) a polymeric core component, said core component comprising the free radical polymerization reaction product of a mixture comprising:
 (1) about 45.0% to about 95.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;
 (2) about 0.5% to about 30.0% by total weight of the mixture of a member selected from the group consisting of ethylenically unsaturated monomers containing at least one quaternary ammonium group and combinations thereof;
 (3) about 4.5% to about 35.0% by total weight of the mixture of a member selected from the group consisting of amine-containing ethylenically unsaturated monomers and combinations thereof; and
 (4) a catalytic amount of polymerization initiator; and
(B) a polymeric shell component disposed generally about said core component, said shell component comprising the free radical polymerization reaction product of a mixture comprising:
 (1) about 70.0% to about 99.5.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;
 (2) up to about 30.0% by total weight of the mixture of a member selected from the group consisting of ethylenically unsaturated monomers containing at least one quaternary ammonium group and combinations thereof;
 (3) about 0.5% to about 30.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof; and
 (4) a catalytic amount of polymerization initiator; and wherein said stabilizer is covalently bound to said shell component.
2. The core-shell particle of claim 1 which comprises:
(A) a polymeric core component, said core component comprising the free radical polymerization reaction product of a mixture comprising:
 (1) about 60.0% to about 70.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) about 10.0% to about 15.0% by total weight of the mixture of a member selected from the group consisting of ethylenically unsaturated monomers containing at least one quaternary ammonium group and combinations thereof;

(3) about 20.0% to about 30.0% by total weight of the mixture of a member selected from the group consisting of amine-containing ethylenically unsaturated monomers and combinations thereof; and (4) a catalytic amount of polymerization initiator; and (B) a polymeric shell component disposed generally about said core component, said shell component comprising the free radical polymerization reaction product of a mixture comprising:

(1) about 80.0% to about 95.0% by total weight of the mixture of a member selected from the group consisting of acrylic esters of alcohols containing from 1 to 22 carbon atoms, methacrylic esters of alcohols containing from 1 to 22 carbon atoms, styrene, substituted styrenes, acrylonitrile, methacrylonitrile, vinyl chloride, vinylidene chloride, vinyl ethers, vinyl esters, N-vinyl amides, acrylamides, methacrylamides, and combinations thereof;

(2) up to about 15.0% by total weight of the mixture of a member selected from the group consisting of ethylenically unsaturated monomers containing at least one quaternary ammonium group and combinations thereof;

(3) about 5.0% to about 20.0% by total weight of the mixture of stabilizer selected from the group consisting of ultraviolet absorbers which contain at least one ethylenically unsaturated group, radical scavengers which contain at least one ethylenically unsaturated group, antioxidants which contain at least one ethylenically unsaturated group, peroxide decomposers which contain at least one ethylenically unsaturated group, and combinations thereof; and (4) a catalytic amount of polymerization initiator; and wherein said stabilizer is covalently bound to said shell component.

3. The core-shell particle of claim 1 wherein said core component constitutes from about 60% to about 90% of the total weight of said particle.

4. The core-shell particle of claim 3 wherein said core component constitutes from about 70% to about 88% of the total weight of said particle.

5. The core-shell particle of claim 1 wherein said shell component constitutes from about 10% to about 40% of the total weight of said particle.

6. The core-shell particle of claim 5 wherein said shell component constitutes from about 12% to about 30% of the total weight of said particle.

7. The core-shell particle of claim 1 wherein the ethylenically unsaturated monomer containing at least one quaternary ammonium group is a salt selected from the group consisting of vinylbenzyltrimethylammonium salts, acryloyloxyethyltrimethylammonium salts, acryloyloxyethyldiethylmethylammonium salts, methacryloyloxyethyltrimethylammonium salts, methacryloyloxyethylbenzyldimethylammonium salts, acryloyloxyethylbenzyldimethylammonium salts, 2-Hydroxy-3-methacryloyloxypropyltrimethylammonium salts, 2-Hydroxy-3-acryloyloxypropyltrimethylammonium salts, methacrylamidopropyltrimethylammonium salts, and combinations thereof; and wherein said salt contains at least one counter anion selected from the group consisting of halides, sulfates, alkylsulfates, arylsulfates, and combinations thereof.

8. The core-shell particle of claim 7 wherein the counter anion is a member selected from the group consisting of chloride, bromide, methosulfate, sulfate, and combinations thereof.

9. The core-shell particle of claim 1 wherein the amine-containing ethylenically unsaturated monomer is a member selected from the group consisting of acrylates of alcohols that contain at least one tertiary amino group, acrylamides of amines that contain at least one tertiary amine group, the condensation reaction product of maleic anhydride and aminoethylpiperidine, 2-vinylpyridine, 4-vinylpyridine, and combinations thereof.

10. The core-shell particle of claim 9 wherein the acrylate of alcohols containing at least one tertiary amino group is a member selected from the group consisting of dimethylaminoethyl acrylate, diethylaminoethyl acrylate, pyrrolidinoethyl acrylate, t-butylaminoethyl acrylate, morpholinoethyl acrylate, (N-methylpiperazinyl)ethyl acrylate, polyoxyethylene(15) cocoamine acrylate, dimethylaminophenethylacrylate, 2-pyridinethylacrylate, dimethylaminoethyl methacrylate, diethylaminoethyl methacrylate, pyrrolidinoethyl methacrylate, t-butylaminoethyl methacrylate, morpholinoethyl methacrylate, (N-methylpiperazinyl)ethyl methacrylate, polyoxyethylene(15) cocoamine methacrylate, dimethylaminophenethylmethacrylate, 2-pyridinethylmethacrylate, and combinations thereof.

11. The core-shell particle of claim 9 wherein the acrylamide of amines containing at least one tertiary amine group is a member selected from the group consisting of dimethylaminoethylacrylamide, dimethylaminopropylacrylamide, pyrrolidinoethylacrylamide, morpholinoethylacrylamide, morpholinemethylacrylamide, (N-methylpiperazinyl)ethyl acrylamide, dimethylaminophenethylacrylamide, dimethylaminoethylmethacrylamide, dimethylaminopropylmethacrylamide, pyrrolidinoethylmethacrylamide, morpholinoethylmethacrylamide, morpholinemethylmethacrylamide, (N-methylpiperazinyl)ethyl methacrylamide, dimethylaminophenethylmethacrylamide, 1-methyl-4-acryloylpiperazines, and combinations thereof.

12. The core-shell particle of claim 1 wherein the polymerization initiator comprises from about 0.1% to about 3.0% by total weight of the mixture employed to produce said shell component and is a member selected from the group consisting of thermal initiators, redox initiators, and combinations thereof.

13. The core-shell particle of claim 12 wherein the polymerization initiator comprises from about 0.2% to about 2.0% by total weight of the mixture employed to produce said shell component and is a member selected from the group consisting of thermal initiators, redox initiators, and combinations thereof.

14. The core-shell particle of claim 1 wherein the ultraviolet absorber is a member selected from the group consisting of hydroxyphenylbenzotrazoles containing at least one ethylenically unsaturated group, hydroxybenzophenones containing at least one ethylenically unsaturated group, modified porphines which contain at least one ethylenically unsaturated group, and combinations thereof.

15. The core-shell particle of claim 1 wherein the radical scavenger is a member selected from the group consisting of tetramethylpiperadine derivatives containing at least one ethylenically unsaturated group and combinations thereof.

16. The core-shell particle of claim 1 wherein the antioxidant is a member selected from the group consisting of sterically-hindered phenols containing at least one ethylenically unsaturated group, diarylamines containing at least one ethylenically unsaturated group, and combinations thereof.

17. The core-shell particle of claim 1 wherein the peroxide decomposer is a member selected from the group consisting of modified triphenyl phosphites which contain at least one ethylenically unsaturated group, modified mercaptans which contain at least one ethylenically unsaturated group, and combinations thereof.

18. The core-shell particle of claim 1 wherein said core-shell particle further comprises a plurality of shell components, each disposed about said core component.

19. A latex comprising an aqueous suspension of core-shell particles of claim 1.

20. An ink jet receptive coating comprising the latex of claim 19.

21. The ink jet receptive coating of claim 20 wherein the coating further comprises a pigment.

22. The ink jet receptive coating of claim 21 wherein the pigment is a member selected from the group consisting of silica, alumina, plastic pigments, calcium carbonate, kaolin clay, and combinations thereof.

23. An ink jet printable product comprising a substrate coated on at least one side with the coating of claim 20.

24. The ink jet printable product of claim 23 wherein the substrate is a member selected from the group consisting of paper, paperboard, wood, plastic film, metal foil, textiles, and combinations thereof.

* * * * *